May 1, 1973     MINORU KURODA     3,730,814
DIE FOR MAKING BEADED ARTICLE
Original Filed March 18, 1969     3 Sheets-Sheet 1
FIG.1
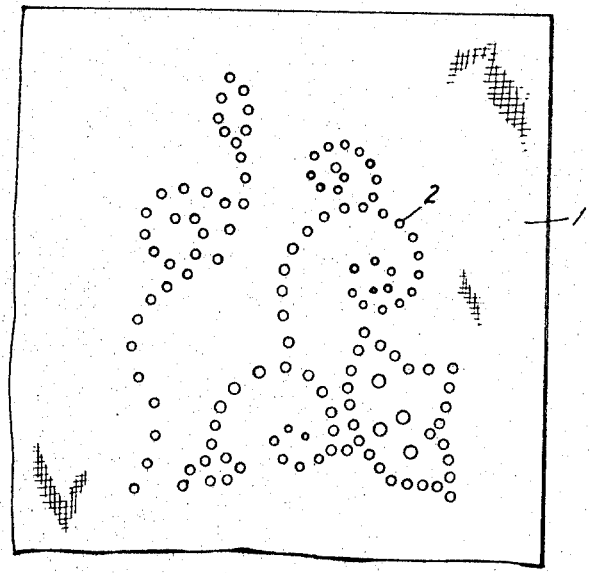
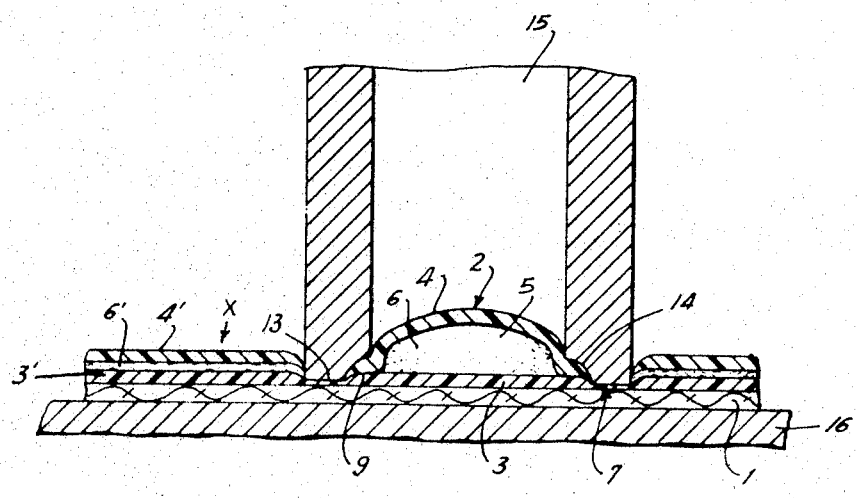
FIG.2
INVENTOR
MINORU KURODA
ATTORNEY FIG. 3
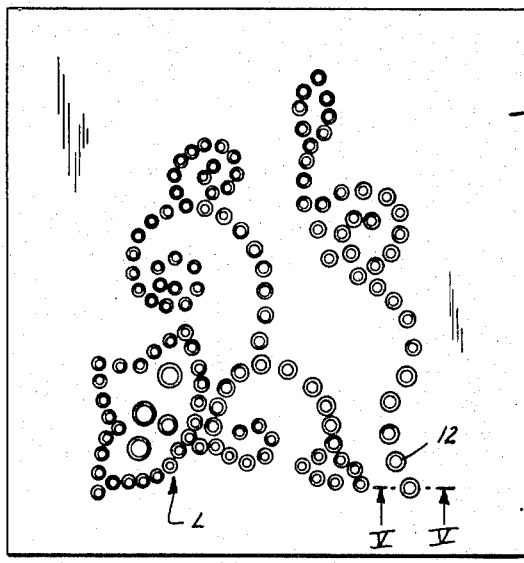
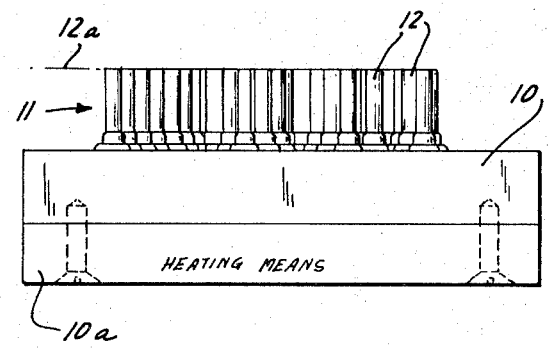
FIG. 4

INVENTOR
MINORU KURODA

United States Patent Office 3,730,814
Patented May 1, 1973

3,730,814
DIE FOR MAKING BEADED ARTICLE
Minoru Kuroda, Amagasaki-shi, Hyogo, Japan, assignor to Nishizawa Shoji Co., Ltd., Osaka, Japan, and The Dimension Weld International Corporation, New York, N.Y., a fractional part interest to each
Application Mar. 18, 1969, Ser. No. 808,128, which is a continuation-in-part of application Ser. No. 662,962, Aug. 24, 1967, both abandoned. Divided and this application Oct. 13, 1970, Ser. No. 80,384
Claims priority, application Japan, Dec. 19, 1966, 41/115,532, 41/115,533, 41/115,535, 41/83,085
Int. Cl. B32b 31/00; B30b 15/34
U.S. Cl. 156—515                                    4 Claims

ABSTRACT OF THE DISCLOSURE

A die for making a beaded article having a support layer on which a bottom layer and a top layer of sheet material are superimposed. The top layer is heat bonded to the bottom layer and both are heat bonded to the support layer along a circumferentially complete narrow annular zone. In the area circumscribed by the annular zone the top layer is provided with a raised self-supporting bead-like prominence which contains ornamental particles visible to a viewer because the top layer is of transparent material. The die has a bas portion from which extend projections whose free end faces are formed with recesses which are bounded by annular cutting edges located in the plane of the respective endface, and by a bevelled shoulder which is inwardly inclined away from the associated cutting edge.

CROSS-REFERENCE TO RELATED APPLICATIONS

The present application is a division of my copending application Ser. No. 808,128, filed on Mar. 18, 1969, which in turn is a continuation-in-part of copending application, Ser. No. 662,962 filed on Aug. 24, 1967, both abandoned, and entitled "Method and Apparatus for Forming Applique Designs."

BACKGROUND OF THE INVENTION

The present invention relates generally to beads, and more particularly to an apparatus for making a beaded article.

In my aforementioned copending application Ser. No. 662,962 I have disclosed a raised padded applique, as well as a method and apparatus for making such an applique. As there pointed out, such an applique can be made by superimposing two layers of material, sandwiching a layer of padding material between them, and bonding the two layers together across the intermediate layer of padding material along a circumferentially complete narrow annular zone. The applique will then appear on one layer as a raised padded design.

My deliberations have shown that I am able to make an article having a beaded appearance, by again resorting to the use of bondable sheet material assemblies. My application Ser. No. 808,128 is directed to a method of making such an article, and the present application is concerned with an apparatus for this purpose.

SUMMARY OF THE INVENTION

It is, accordingly, a general object of the present invention to provide a beaded article.

An additional object of this invention is to provide a die for use in apparatus capable of carrying out a method of making such an article, and which is simple and inexpensive and permits the providing of large or small numbers of simulated beads on an article, such providing being carried out simultaneously for all simulated beads, or individually.

In pursuance of the above objects, and others which will become apparent hereafter, one feature of my invention resides in the provision of a die for making such a beaded article. The die has a bas provided with projecting wall means having an exposed fan which is formed with at least one recess. The recess is ringed by an annular cutting edge located in the plane of the face, and within the confines of the cutting edge by a bevelled annular shoulder which is inclined inwardly away from the cutting edge. To make a beaded article of the type under discussion, I superimpose upon a base an assembly comprising a top and a bottom layer of sheet material with spacing means therebetween. At least the top layer consists of a plastically flowable material. I thereupon press the top layer against the bottom layer and the base in a circumferentially complete narrow annular zone by contact with the bevelled annular shoulder of the die while I maintain the top layer spaced from the bottom layer in the area which is circumscribed by the annular zone. While the pressure is in effect, I heat-bond the layers to one another as well as to the base in the aforementioned circumferentially complete narrow annular zone and simultaneously cause the top layer to undergo plastic flowing inwardly of the annular zone as well as in direction away from the bottom layer. This results in the formation of a raised self-supporting bead-like prominence in the aforementioned area of the top layer.

Advantageously the top layer will be a light-transmitting sheet material, particularly a synthetic plastic material, and I prefer that the top layer be a transparent plastic material. The bottom layer may also be a transparent plastic material and may, but need not be capable of plastic flowing. The spacing means is advantageously in form of discrete particles having an ornamental appearance, that is being colored, light-reflecting or the like, and they will be visible in the interior of the bead-like prominence providing a desired appearance to the same. Of course, the base may be of any desired suitable material, for instance a textile material such as a dress, another garment or the like, to which one or, usually, more than one of the bead-like prominences are to be affixed.

By resorting to my novel invention I obtain an article wherein large or small numbers of such bead-like prominences may be provided simultaneously, and it goes without saying that they may be arranged in any desired pattern, as will be discussed in more detail below. By contrast it should be pointed out that the affixing of conventional beads to an article is to this day carried out by hand and individually, with the result that articles which are beaded in the customary manner are very expensive because of the manual labor involved.

It should be further pointed out that an article made with the die according to my present invention has the bead-like prominences affixed thereto permanently, so that they will not separate regardless of whether the article is washed, drycleaned, wetted or the like. The simulated beads provided in accordance with my present invention have permanent brightness because the ornamental particles are protected in the interior of the respective bead-like prominence. Furthermore, an article provided with beading in this manner is light because the weight of the individual bead-like constructions is considerably less than that of conventional beads.

It is also evident that beading of this type may be provided not only on garments or the like, but also on wall paper, furniture, other types of wall coverings, or in fact almost any type of base, including textile materials, plastics, leather, glass, wood and the like. In fact, such beading may even be provided on a metallic base if desired.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a fragmentary somewhat diagrammatic plan view of a beaded article made in accordance with the present invention;

FIG. 2 is a fragmentary elevation showing a bead according to the present invention being formed by a single die;

FIG. 3 is a view similar to FIG. 1, but illustrating the die used for making the article shown in FIG. 1;

FIG. 4 is a side-elevational view of FIG. 3;

DESCRIPTION OF THE PREFERRED EMBODIMENTS

Figure 5:
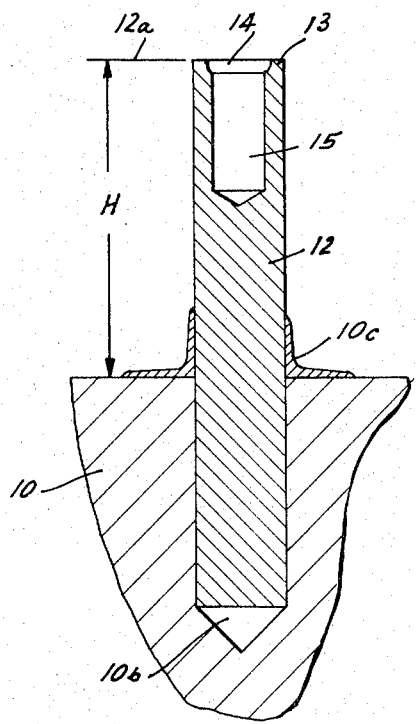
FIG. 5 is a section taken on the line V—V of FIG. 3.

Discussing now the drawing in detail, and firstly FIGS. 1 and 2 thereof, it will be seen that I have illustrated in FIG. 1 a beaded article which here shall be assumed to consist of a textile base layer 1 on which I have superimposed a bottom layer 3 and a top layer 4. In the illustrated embodiment both the top layer 4 and the bottom layer 3 consist of synthetic plastic material, for instance polyvinyl chloride, although it will be appreciated that they need not be of the identical material. Spacing means is interposed between the layers 2, 3 and 4, and this is here illustrated (compare FIG. 2) as a layer 6' consisting of a plurality of discrete particles 6, as clearly shown in FIG. 2. The particles 6 are brightly colored and may be fine slivers of polyester, nylon or the like, but it should be understood that other materials are similarly suitable. The sheet 4 in the illustrated embodiment is transparent, preferably clear, so that the particles 6 are visible. A support 16 is provided in form of a table, plate or the like on which the layers 1, 3, 4 and 6' are temporarily supported. At least one of the layers 3 or 4 is heat-bondable and capable of plastic flowing when exposed to the requisite conditions.

I provide a mold or die which will be discussed in further detail with reference to FIGS. 3 and 4 and which is provided with as many mold or die portions as beads—or bead-like prominences as they might more properly be called—are to be provided. These prominences are identified with reference numeral 2 and may be distributed, as shown in FIG. 1, in any desired manner, order or pattern.

Each of the mold portions which is operative for making one of the prominences 2 is of the general type shown in FIG. 2 in that it is provided with a recess 15 which is bounded by an inner circumferential surface and whose open end is surrounded by a cutting and pressure face 13 to which there is inwardly adjacent a beveled or arcuately curved annular shoulder 14 whose radial width is as great as the radial width of said pressure face 13. The inner diameter of the recess is only a fraction of depth of the recess.

To make an article of the type under discussion and shown in FIG. 1, an assembly consisting of the layers 3, 4 and 6 is superimposed upon the support layer 1 and the total assembly is rested on the plate or table 16. Thereupon the die is moved downwardly in the direction of the arrow X shown in FIG. 2 so that the cutting and pressure edge 13 engages a circumferentially complete narrow annular zone of the assembly, pressing the layers 4 and 6 against the layer 3 and all of them against the support layer 1. This results in the inclusion of an area of the top layer 4 within the recess 15, this area being normally circular but which may also be of other-than-circular outline. Simultaneously the mold is heated as will be discussed below, and this results in heat-bonding of the layers 3 and 4 to one another as well as to the base or support layer 1. Such bonding takes place along the circumferentially complete narrow annular zone corresponding to the cutting and pressure face 13, it being understood that at least the layer 4, and generally the layers 3 and 4, consist of thermoplastic material. Because of the beveled shoulder 14 the material of the bead-like prominence 2 which is being produced is of but little changed thickness in the region 9, that is the region below the beveled shoulder 14. The region below the cutting and pressure face 13, however, is melted and drastically reduced in thickness, as evident from FIG. 2. This results in severing of the portions 4', 6' and 3' of the respective layers 4, 6 and 3 from the portions located within the confines of the die. The air entrapped between the layers 3 and 4 in the pockets existing between the individual particles of the layer 6 expands as a result of the heat-bonding of the layers 1, 3 and 4 and results in plastic deformation of the layer 4 within the confines of the recess 15 in direction radially inwardly from the narrow annular zone 8—in which the layers are bonded together—as well as in direction away from the bottom layer 3 and deeper into the recess 15. The result is a hollow self-supporting bead-like prominence 2 which, because of its dome-shape and because of the inherent resistance of the material of the layer 4 to deformation, is capable of withstanding stresses tending to collapse it when the air in its interior cools and has its expansion reversed. The formation of the prominence 2 may be aided by proper selection of the bevel of the shoulder 14, serving, when pressure is exerted in the manner shown in FIG. 2 in the direction of the arrow X, to initiate plastic flowing of the material of the layer 4 radially inwardly and in direction deeper into the recess 15. In fact, bonding of a type other than heat-bonding is conceivable and it is also conceivable that by proper configuration of the beveled shoulder 14, the prominence 2 could be provided in this case without the aid of expanding air simply as a result of plastic flowing of the material of the layer 4 resulting from pressure exerted on it by the die.

It will be appreciated that in FIG. 2 only a portion of the die used for FIG. 1 has been illustrated, and that the analogous process takes place simultaneously for all of the various prominences 2 which are shown in FIG. 1. This can, of course, be done sequentially but preferably it is done simultaneously, with the die being configurated accordingly, as will be discussed. When the article is completed and the various prominences are provided as shown in FIG. 1, the die is withdrawn in direction opposite the arrow X in FIG. 2, and the severed remainders 3', 4' and 6' of the layers 3, 4 and 6 may be peeled away, thus leaving only the prominences 2 attached to the support or base layer 1. The cutting edge along which the severing occurs is identified with reference numeral 7 in FIG. 1.

Coming now to FIGS. 3 and 4 it will be seen that in these figures I have somewhat diagrammatically illustrated my novel die for making the article shown in FIG. 1. It will be seen that in this embodiment the die comprises base means 10 in form of a platen provided with wall means 11 having an exposed face 12a. In the illustrated embodiment the wall means 11 is constituted by a plurality of tubular mold portions 12 of the configuration shown for instance in FIGS. 2, 5 and 6. The free end faces of these mold portions 12 together constitute the exposed face 12a and, as shown in FIG. 2 for example, the exposed face 12a is provided with a plurality of recesses 15 extending inwardly. Suitable heating means 10a is provided, connected with the platen 10 for heating the same and thereby the wall means 11.

As shown in FIG. 5, which is the section taken on the line V—V of FIG. 3, the tubular wall means may be provided in form of a plurality of pins 12 each of which is received in a bore 10b provided in the base means 10 and rigidly retained therein, for instance by a weld 10c. The distance to which each of the pins 12 projects from the base means 10 is identified with reference numeral H and it will be seen that the free end faces of each of the pins 12 are located, as illustrated by the dimension H, in a common plane which is the exposed face 12a of the wall means 11. Reference numerals 13, 14 and 15 identify features which have already been discussed with respect to FIG. 2.

Figure 6:
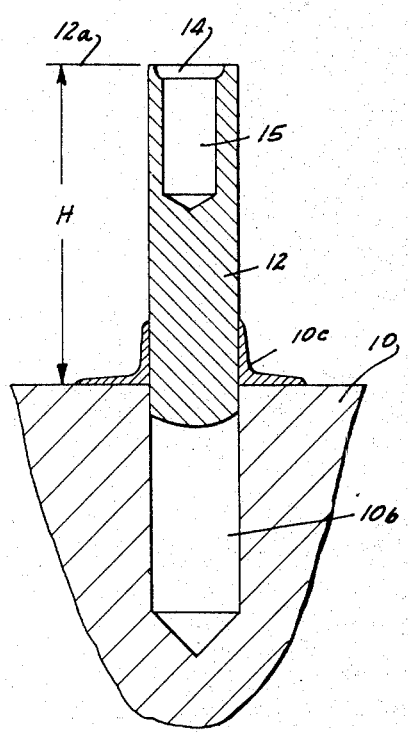
FIG. 6 is a view similar to FIG. 5 but illustrating another embodiment.

FIG. 6 differs from FIG. 5 only in that it illustrates that the respective pins 12 need not fill the bores 10b in the member 10, but can also be shorter. Evidently, the bores 10b themselves could be of lesser depth in this case.

The heating means illustrated may be of conventional type, and is well known in the art. In fact, it has been discussed in some more detail in my copending application Ser. No. 662,962 to which reference may be had.

Figure 7:
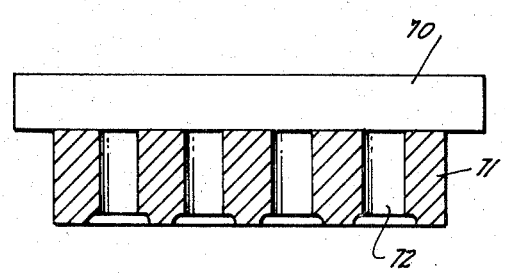
FIG. 7 is a diagrammatic partly sectioned view illustrating a further embodiment of the die.
Figure 8:
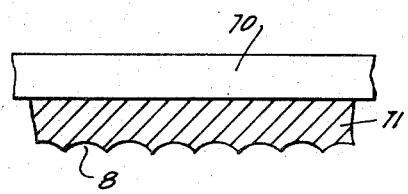
FIG. 8 is a view similar to FIG. 7 but illustrating yet another embodiment of the die.

The embodiment in FIG. 7 illustrates that instead of the tubular wall means the base means which is here identified with reference numeral 70 may be provided with wall means 71 having recesses 72 whose configuration corresponds to that of the recesses 15 provided in FIG. 5. The cutting edges and the beveled shoulders are the same and are therefore not specifically identified with reference numerals. In the embodiment of FIG. 7 the recesses extend through the entire thickness of the wall means 71. FIG. 8, on the other hand, shows that the recesses 80 need not extend over the entire thickness of the wall means 71 carried by the base means 70, but can be of such a depth as only to allow the desired height of the prominences 2 to be formed. In other words, whereas the recesses 72 are higher than necessary for the formation of the prominences 2, the recesses 80 in FIG. 8 need be only of such height that the prominences 2 can just form.

It will be appreciated, of course, that where the tubular wall means of the type shown in FIG. 4, for instance, is provided, all of the individual tubular members must extend in parallelism with one another.

The interior of the prominences 2 is only partially filled, as shown in FIG. 2, with the ornamental particles of the layer 6. It is emphasized that if these ornamental particles are made from certain materials, such as polyester, nylon or the like, they will adhere electrostatically to the inside of the wall forming the respective prominence 2, and this assures that they are readily visible and provide the desired visual effect.

Resort to my present invention results in the provision of bead-like prominences of strictly uniform configuration and strictly uniform type. Evidently, as many or as few of the prominences 2 as desired may be provided in a single operation, and thus my novel invention is particularly suitable for mass production at low cost, but is also capable of being used for individual production of one or a few of the prominences 2 at a time.

It is also emphasized that different sizes and shapes may be selected for the prominences, so that these need not be circular but can also be oval, rectangular, or in fact of a great variety of different shapes. Evidently, the single die may be provided with means for producing two or more different-shaped prominences at the same time. Also, it is possible to provide continuous sheets or strips of base or support material with the prominences 2, and in this case the pattern will recur at intervals which are determined by the size of the mold being used. Naturally, there is no limit on the type of pattern which may be provided, and this may be accomplished either by providing a single die with the desired pattern, or utilizing a die capable of producing one or only a few of the prominences 2 at a time and moving the die and/or the support or base material in such a manner as to obtain the pattern by repeated use of the die.

It is still emphasized that the provision of the individual particles of the layer 6 results in random scattering of light impinging on these particles through the portion of the layer 4 which constitutes the respective dome-shaped prominence 2, and this increases the brilliance of the prominences several times when direct light impinges upon them. The individual bead-like prominences are waterproof so that water cannot enter into them. Individual ones of the prominences 2 may be spaced as closely as 1 mm. and as many as 2,500 or even more individual prominences 2 may be produced at one and the same time. The versatility of my invention will thus be obvious.

Evidently, it is possible to provide the desired pattern of prominences 2 not on a garment or the like, but on a patch which need not be of textile material, and which can then be suitably fixed to an article on which it is desired, for instance by sewing, by use of an adhesive or the like.

It will be understood that each of the elements described above, or two or more together, may also find a useful employment in other types of applications differing from the types described above.

While the invention has been illustrated and described as embodied in a die for making a beaded article it is not intended to be limited to the details shown, since various modifications and structural changes may be made without departing in any way from the spirit of the present invention.

What is claimed as new and desired to be protected by Letters Patent is set forth in the appended claims.

1. A die for making a beaded article, comprising base means; a plurality of tubular wall portions each projecting from said base means and having a free open end provided with an inwardly extending recess whose diameter is only a small fraction of its length and which has a smaller-diameter inner portion and a larger-diameter outer portion adjacent said open end; a planar annular pressure face bounding the respective open end and an inner circumferential surface bounding the respective inner portion; an arcuately curved annular shoulder bounding the respective outer portion and extending from an inner margin of the associated planar annular pressure face to the associated inner circumferential surface, said planar annular pressure face having a radial width which is at least as great as the radial width of said annular shoulder; and heating means arranged in said base means for heating said tubular wall portions including the respective planar annular pressure face and arcuately curved annular shoulder.

2. A die as defined in claim 1, said tubular wall portions being integral with said base wall means.

3. A die as defined in claim 1, said tubular wall portions being discrete tubular members each including a part received in a hole provided in said base means and being rigid therewith.

4. A die as defined in claim 3, further comprising fixing means fixing each tubular member rigidly with said base means.

References Cited

UNITED STATES PATENTS 3,026,233    3/1962    Scholl et al. _____ 156—515

DOUGLAS J. DRUMMOND, Primary Examiner

U.S. Cl. X.R.

158—583; 425—385, 109